June 19, 1956 — M. E. CROWLEY — 2,750,945
HOP-PICKING MACHINE
Filed Sept. 28, 1951 — 7 Sheets-Sheet 1

INVENTOR.
MILLARD E. CROWLEY
BY
ATTORNEYS

June 19, 1956  M. E. CROWLEY  2,750,945
HOP-PICKING MACHINE

Filed Sept. 28, 1951  7 Sheets-Sheet 3

INVENTOR.
MILLARD E. CROWLEY
BY Lippincott & Smith
ATTORNEYS

June 19, 1956  M. E. CROWLEY  2,750,945
HOP-PICKING MACHINE
Filed Sept. 28, 1951  7 Sheets-Sheet 4
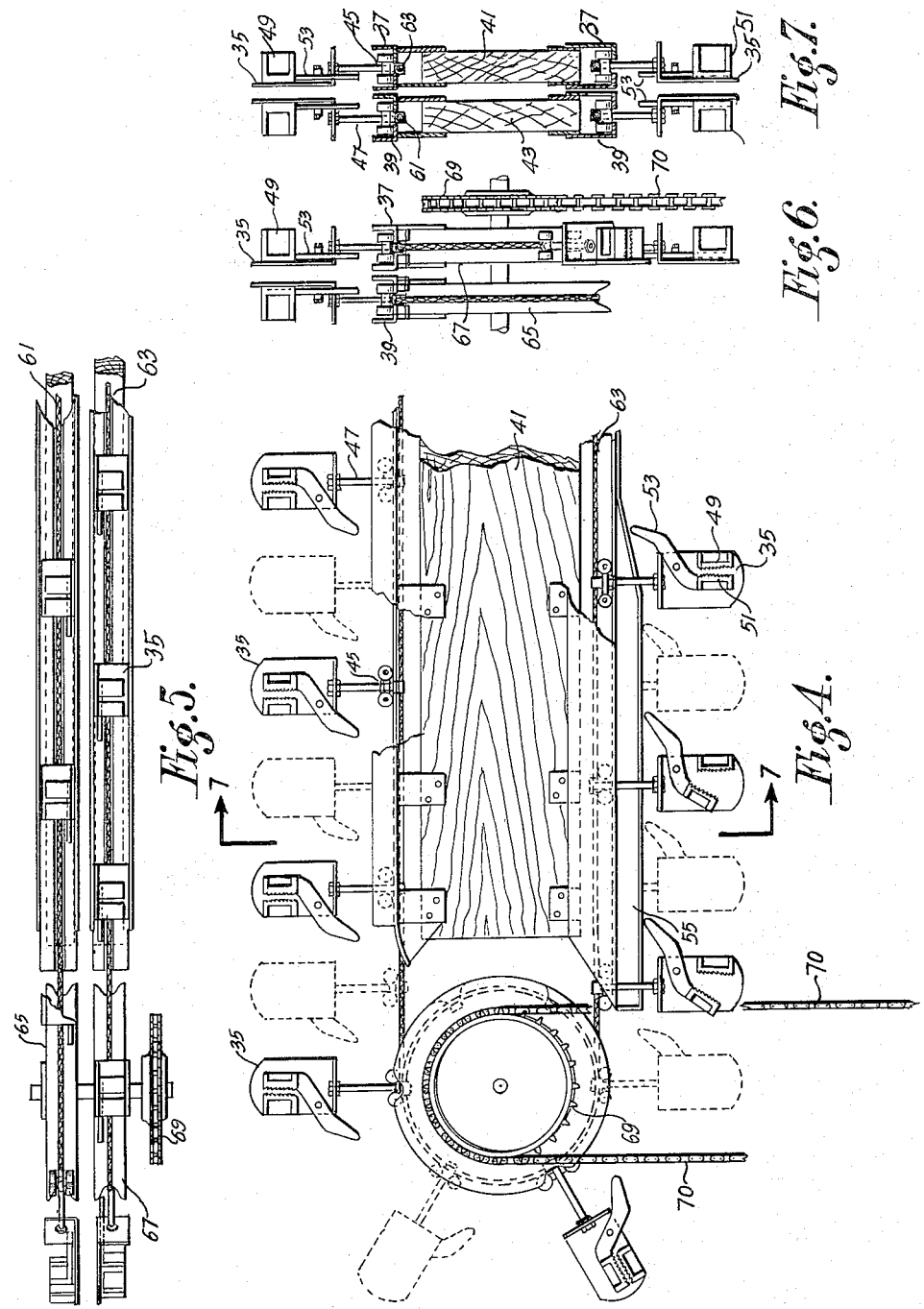
INVENTOR.
MILLARD E. CROWLEY
BY
ATTORNEYS

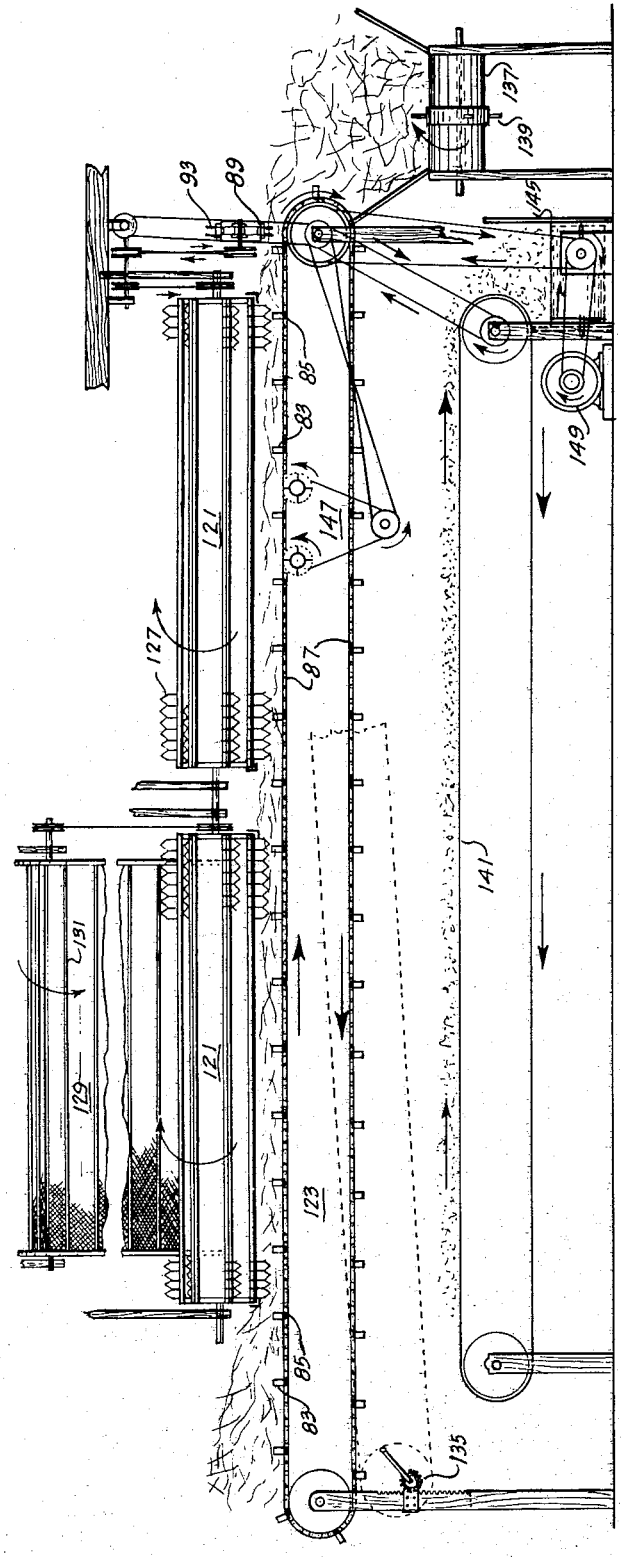

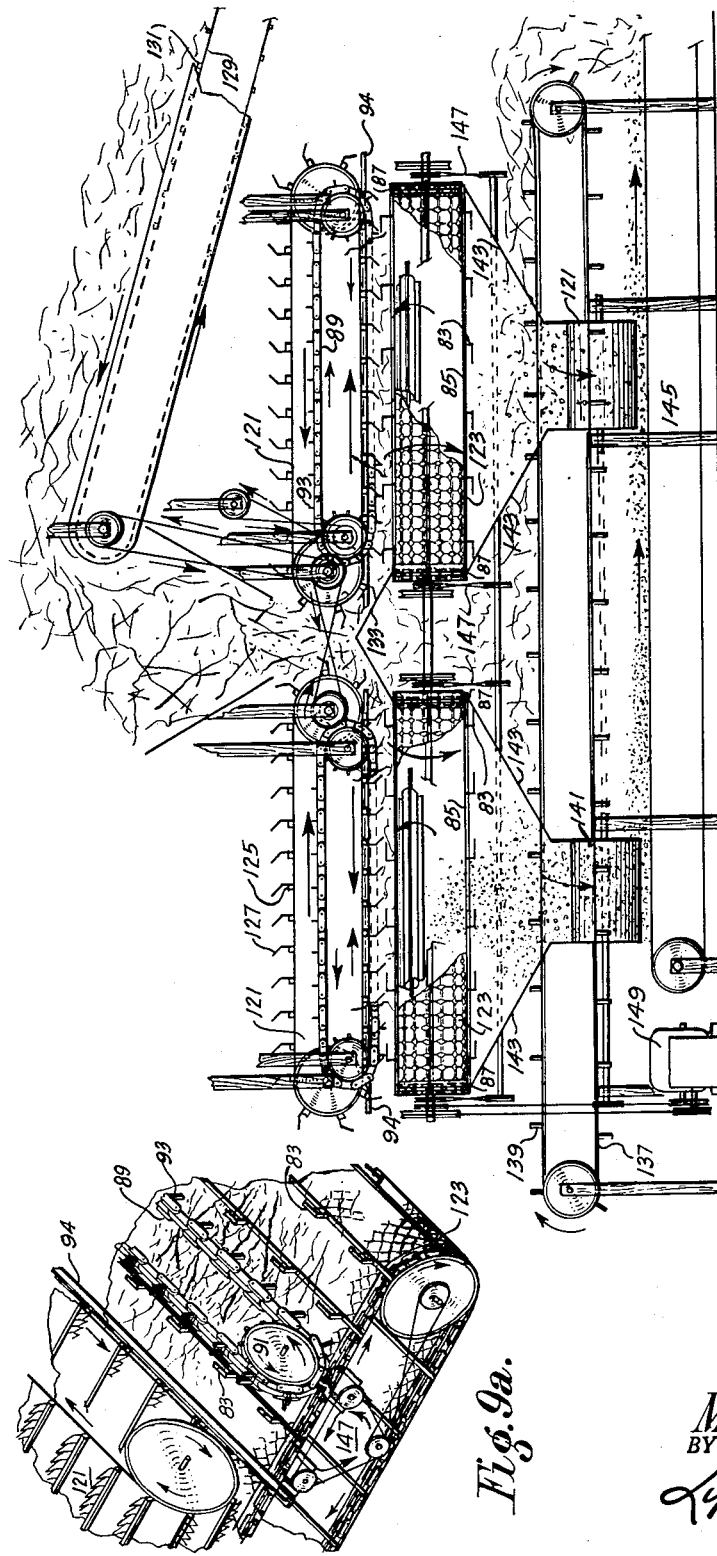

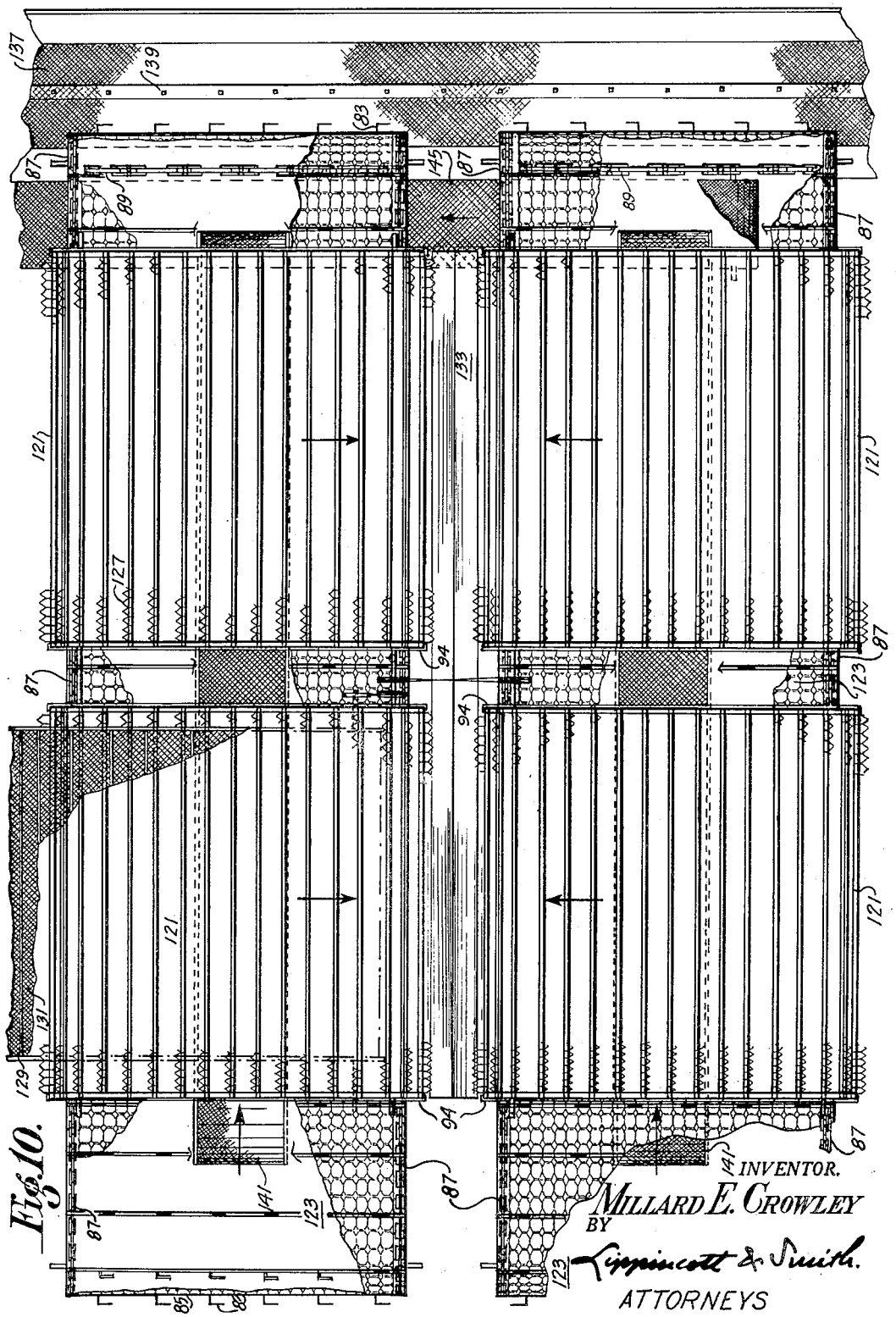

United States Patent Office 2,750,945
Patented June 19, 1956

2,750,945

HOP-PICKING MACHINE

Millard E. Crowley, Santa Rosa, Calif., assignor to Lippincott & Smith, San Francisco, Calif., a partnership Application September 28, 1951, Serial No. 248,731

9 Claims. (Cl. 130—30)

This invention relates to machines capable of removing hops from hop vines.

Various types of machines capable of picking hops from vines have been developed in the past. The type of machine generally employed consists of a series of revolvable drums, each having a plurality of V-shaped flexible wire fingers disposed about the peripheries thereof. Two or more drums are spaced apart to allow conveyors to introduce vines therebetween in order that the fingers may comb the vines and thus remove the hops therefrom. Recently, United States Letters Patent No. 2,496,858 was granted to this applicant for an improvement in a Hop Picking Machine. The structure disclosed in this patent related to a pair of oppositely disposed caterpillars each comprising endless chains or cables having picking bars and fingers spaced therealong to rake hop vines positioned between the caterpillars. The present invention particularly relates to an improved device for accomplishing the type of hop-picking described in the former construction but permits of continuous operation which speeds the picking in a way not heretofore contemplated.

As is well known, hops may grow on long vines supported by trellises twelve to eighteen feet high, in which case machine picking is usually employed. In contrast with the foregoing, hops may grow on short hop vines which are supported by about 6 foot poles in order that hand picking may be employed. If the hops are to be separated from the long vines in a main packing plant, it is necessary to cut the vines and transport them to the plant where they pass through the picking machine for harvesting. During the transporting and picking processes, "short-arms" or vine branches are inadvertently broken from the vines. Consequently, in the past, the hops growing on these arms or branches had to be hand-picked or picked by special machines. The term "short-arm" as herein used will be understood to include branches per se, as well as any portion of the main vine which may be broken off whereas the term "bine" is generic to vines and arms. Thus, it is readily apparent that short-arm hops may represent as much as 25 per cent of the total hop crop.

By employing a new and novel structure of the type herein set forth it will be seen that there is disclosed a machine for efficiently salvaging short-arm hops simultaneously with the picking of the vines. A modification thereof permits short-arm picking per se.

Basically, this invention comprises one or more pairs of oppositely disposed caterpillars each comprising picking bars and fingers linked together to form an endless belt or chain. The use of the word "caterpillar" herein is intended to include multi-shaped frames or supports having chains or belts supported for movement in endless fashion. At least one substantially horizontally moving belt, preferably of a wire mesh construction, is positioned generally adjacent the picking fingers to convey the short arms or vines along the caterpillar surfaces for picking. By providing each of the caterpillars with substantially horizontal and vertical reaches, picking may be accomplished along the substantially horizontal and vertical surfaces thereof.

Motion is imparted to the picking bars to cause transversal of the respective vertical reaches in the same direction and to provide opposed traversal of the respective horizontal reaches. By driving the horizontal belt in a direction which is normal to the directions of horizontal and vertical traversal, optimum picking action is obtained.

In order that the herein described machine will simultaneously pick vines and short arms, the vertical reaches of the caterpillars are extended to a length approximately equal to that of the vines. Of utmost importance is the fact that branches or short arms broken or torn from the vines which are being combed by picking fingers traversing the vertical reaches are gravity fed (aided by the vertical picking fingers) to the horizontal belt or belts where the picking fingers traversing the horizontal reaches pull at them oppositely until one or another of the caterpillars succeeds in drawing the arms beneath it along the horizontal reach thereof. The short arms then become entangled under clamps or among uprising stubs located along the horizontal belts and are thus conveyed along the horizontal reaches of the caterpillars for picking.

A conveyor belt is provided in order that arms (branches or short arms) may be introduced into the short arm picker per se. This belt allows the arms to fall between adjacent but oppositely disposed caterpillars. Also, the horizontal belt is extended to project beyond the caterpillars in order that arms may be hand- or shovel-fed to the machine. For effective feeding of vines to the combined vine and arm picking machine, a pair of endless chains or cables, each having vine graspers spaced therealong is provided. These graspers are adapted to receive vines from trucks or other vehicles and to convey them through the machine for picking and then to discard the picked vines. By employing a coupled multi-pulley driving unit, preferably located above and at the rear of the machine, it is possible to insure that the vine graspers respectively coupled to the cables will at all times be staggered if recesses are located in the periphery of each pulley to engage the individual vine graspers and hence impart motion to the cables.

Many functions of the machines of the instant invention although relatively simple, are believed to be new to the hop picking industry. The entire functions of these machines are sufficiently non-complex as to admit of very sturdy structure capable of performing them. Sturdy machines are requisite to the hop picking industry as the overall harvesting period may comprise only about 40 days and in order that large crops may be harvested during this time interval 24 hours per day operation of the machines is often required.

Having set forth the invention broadly, included among the objects thereof are the following: to provide a hop picking machine capable of the simultaneous raking of hops from vines and short arms; to provide apparatus capable of multi-directional combing of hop vines and arms; to combine in a single machine, functions heretofore deemed characteristic of separate machines, as well as, to produce additional functions without the necessity of employing all parts required by the separate machines; to combine in a single machine, capable of continuous operation over extended time intervals, the functions of hop vine and arm picking; and to provide a short arm picker per se capable of optimum picking action.

Other and further objects of the instant invention will become apparent to those skilled in the art from a reading of the following detailed description thereof, when taken in conjunction with the accompanying drawings wherein:

Fig. 1a is an enlarged detailed representation of a portion of the structure embodied in Fig. 1 to show more particularly a suitable means to adjust the tension of the picking arrays;

Fig. 2d is an enlarged view in perspective of a portion of the vine discharge end of the combined machine;

Figure 1:
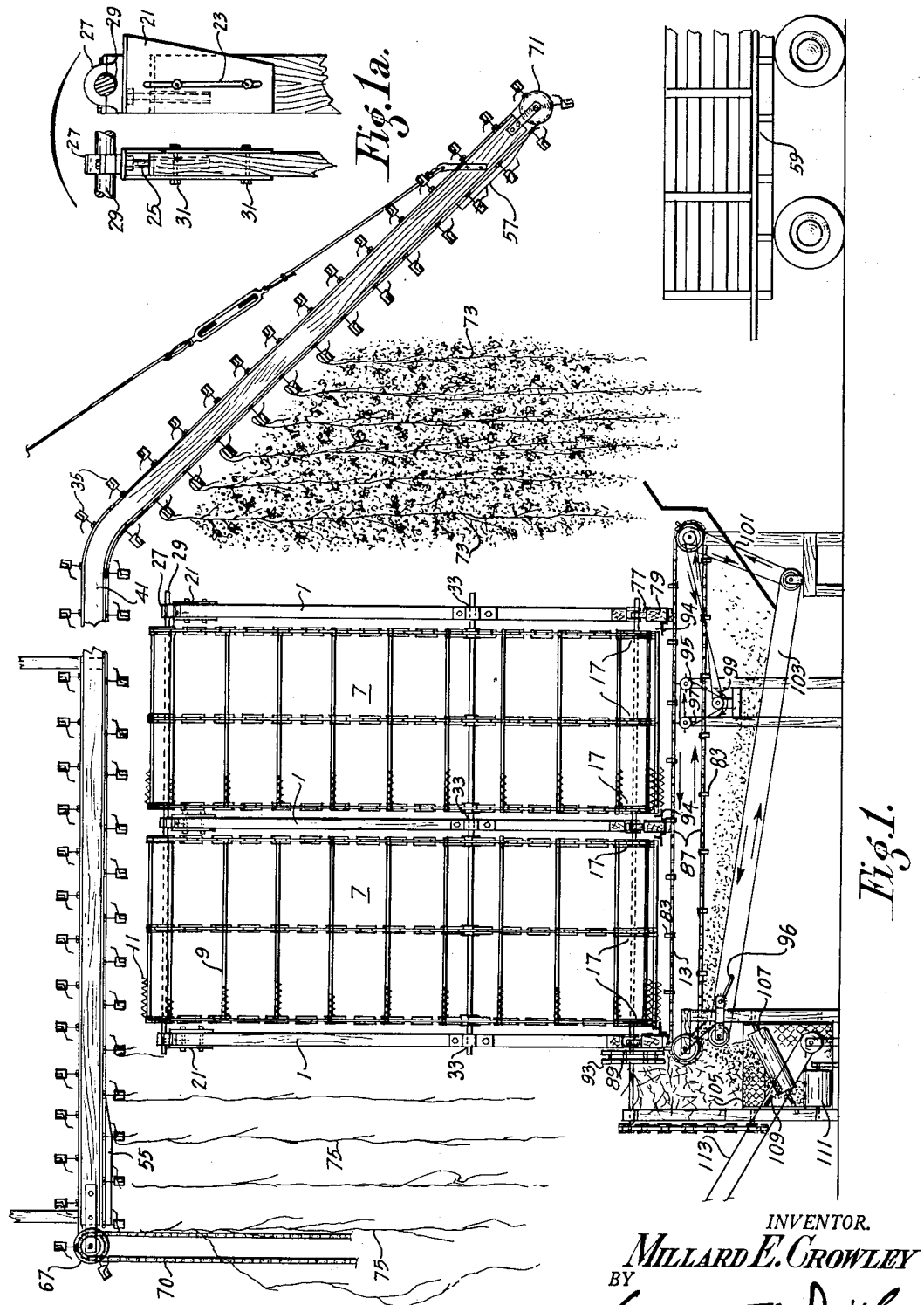
Fig. 1 is a view in side elevation of the combined vine and arm picker machine.
Figure 2:
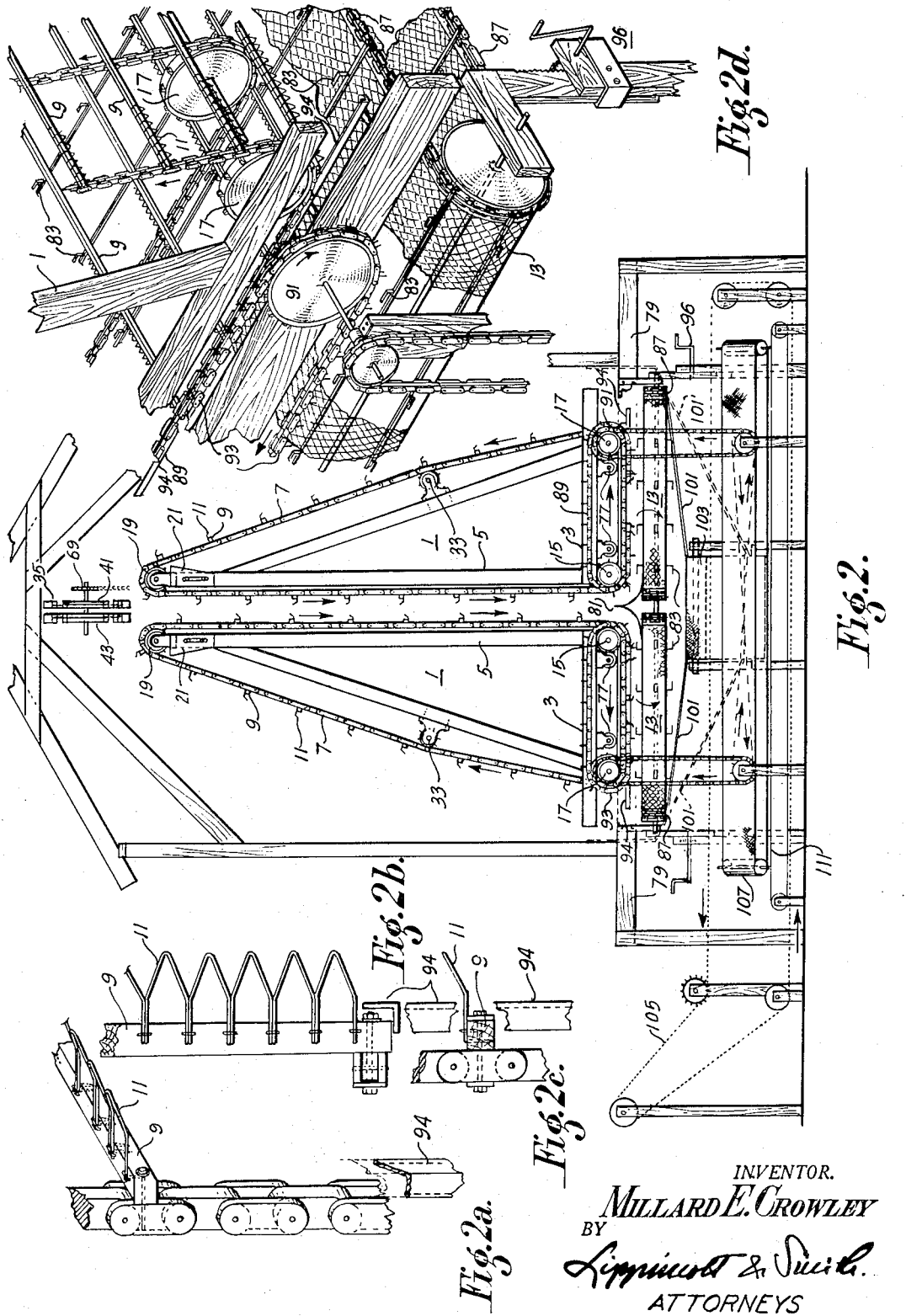
Fig. 2 represents the structure of Fig. 1 as viewed from the vine discharge end of the machine whereas Figs. 2a through 2c inclusive show further detailed structure on enlarged scale of the combined vine and arm picker machine and emphasize the structure of the picking bars and fingers.
Figure 3:
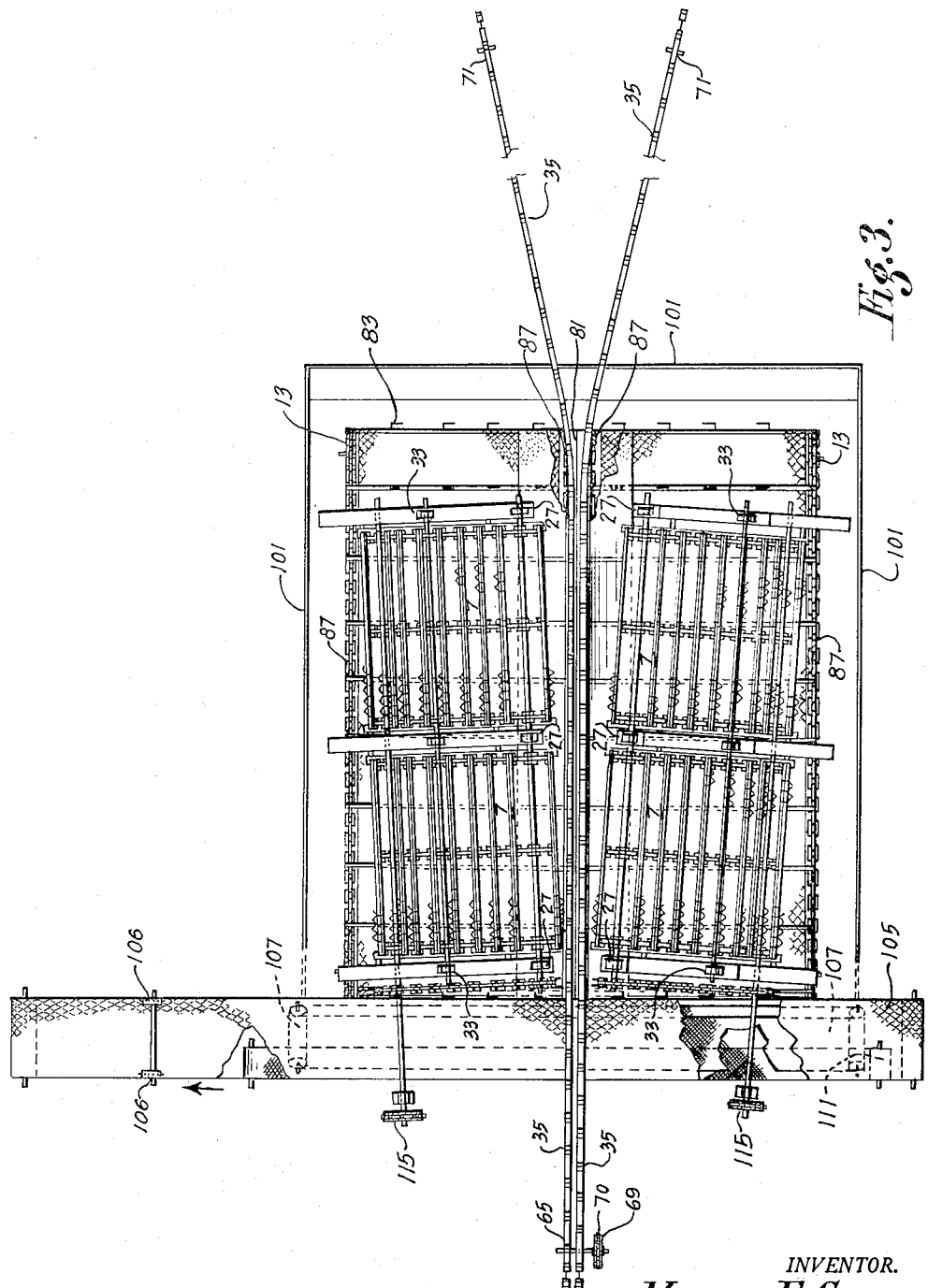
Fig. 3 is a plan view of the machine of Figs. 1 and 2.

Figs. 4 to 6 inclusive are conventional elevational, plan and end views respectively on enlarged scale of the vine feeding structure employed in the machine of Figs. 1–3;

Fig. 7 is a cross sectional view of the structure of Fig. 4 taken along the plane 7—7;

Fig. 8 is a side elevational view of the structure embodied in the arm picker machine;

Figs. 8a through 8e show detailed portions on enlarged scale of the arm picker of Fig. 8 wherein Fig 8a shows the picking bars and fingers;

Fig. 8b shows a part of the conveyor and associated clamps;

Fig. 8c shows a clamp separate from the conveyor;

Fig. 8d shows the release mechanism; and,

Fig. 8e shows an upriser stub suitable for use in place of the clamp of Fig. 8c;

Fig. 9 represents the structure of Fig. 8 as viewed from the discharge end of the arm picker machine with Fig. 9a showing in perspective on enlarged scale a portion of the extremity thereof; and Fig. 10 is a view in plan of the structure of Figs. 8 and 9.

Referring now to the drawings and more particularly to Figs. 1–7, a supporting structure or frame generally designated at 1 and having a horizontal reach 3 and a vertical reach 5 is adapted to carry an endless chain or cable array 7 (see particularly Fig. 2). This array is comprised of a plurality of picking bars 9 each having picking fingers 11 evenly disposed along the lengths thereof, as is best shown in Figs. 2a and 2b.

The combination of a picking array and a frame support for the array constitutes a single picking unit. By oppositely disposing a plurality of these units in pairs and by further providing conveyors to move adjacent the respective horizontal reaches of the units, the machines achieve a multi-directional picking action of a type heretofore never realized, as will hereinafter more fully be explained.

This action may best be understood by reference to Fig. 2 wherein horizontal conveyors 13, preferably of a construction similar to that shown in Fig. 8b, are disposed adjacent the horizontal reaches 3 of the frames 1 and are adapted to move in a direction to correspond with that of the arrows marked thereon. A set of sprockets mounted along the reaches of the frames 1 allows the picking arrays 7 to traverse the frame peripheries in endless fashion. The horizontal reaches include inboard sprockets 15 and outboard driving sprockets 17. The frame apexes support sprockets 19 which may be moved vertically to tighten the picking array chains and hence remove any sagging that may be developed over extended periods of operation.

The adjusting means for sprockets 19 are best shown in Fig. 1a wherein a U-shaped plate 21 having longitudinal slots 23 in the arms thereof is adapted to fit over the apex of the frame. A bolt 25 threaded into the frame 1 biases the plate 21 in the vertical direction when turned. Integrally affixed to the top portion of the plate is a journal 27 for the sprocket shaft 29. Hence, movement of plate 21 in the vertical direction also moves sprocket 29 there- by adjusting the tension applied to the picking array 7. After the correct tension has been attained, bolts 31, which extend through the slots 23 in plate 21 and through a corresponding slot in frame 1, may be tightened against the plate to secure it in the desired operating position relative to the frame.

A number of idlers 33 are respectively disposed along the back sides of the frames further to maintain the picking arrays free of the frames 1. Thus, as is apparent from Fig. 2, the location of the various sprockets and idlers permits of movement of the picking arrays along planes substantially parallel to the respective vertical and horizontal reaches of the frames. In this figure the oppositely disposed frames 1 each have picking arrays 7 respectively traversing the surfaces thereof with the adjacent arrows indicating the respective movement of these arrays. Hence it is seen that the arrays move in a downward direction along the vertical reaches 5 but in opposed directions along the horizontal reaches 3. An important feature of this invention thus resides in the relative directions of motion between the opposed arrays 7 and the horizontal conveyors 13 as the resulting action provides a most effective manner of combing hops from vines.

The hop vines are preferably introduced to the picking action by means of the vine conveying arrangement, best shown in Figs. 4–7. In this arrangement a number of vine graspers 35 are adapted to move along tracks 37 and 39, which tracks are respectively disposed on supporting members 41 and 43. The graspers shown in dotted outline are those traveling along track 39 whereas the graspers in solid outline follow track 37. The purpose of the dotted outline use is to allow emphasis to be placed on the graspers associated with the near track 37. Movement of the graspers along these tracks is facilitated by the wheel or roller sets 45, similar in nature to barn door sliders, which sets carry these graspers by means of connecting links 47. Each of the graspers 35 includes a pair of jaws disposed outwardly therefrom and adapted to cooperatively grasp and carry the hop vines. One jaw 49 of each pair may form an integral part of the grasper, whereas the other jaw 51 of the pair is pivotally mounted thereon. The jaws 51 each include a handle-like extension 53 adapted to engage bumpers 55 and 57 (Fig. 1) which are located along the support 41, thereby to open the jaws, as is best shown in Fig. 4.

The track supporting members 41 and 43 are secured to a sheltering structure provided for the picking machine. As such structure, however, forms no part of the present invention, the drawings which are more or less schematic representations have not been unduly complicated with detailed structural showings but include only basic supporting structures. In certain parts of this country, however, the elements permit such machines to stand in the fields unprotected by buildings, in which case, ground supports would necessarily be provided for the members 41 and 43. But, in either event, these members comprise respectively right and left supporting structures for the vine conveying mechanism. Thus, it is apparent from Figs. 1 and 2, that the right and left conveyor members are sufficiently separated at their respective vine loading ends to permit alternate loading of them from a single platform, such as a truck 59. From this truck they respectively rise and converge to occupy adjacent positions slightly elevated from the picking units.

As the vine graspers 35 must follow arcuate paths in proceeding from, and returning to, the truck 59, cables rather than chains are preferred for respectively linking the 160 or so graspers which comprise a single conveyor. Thus, cables 61 and 63 are provided to connect, in endless fashion, graspers 35 of the respective right and left hand vine conveyors. Referring again to Fig. 4, the cables 61 and 63 are adapted to ride along the tracks 39 and 37 respectively with vine graspers 35 being coupled to the cables by means of the links 47. The cable drive comprises multi-pocketed pulleys 65 and 67 which are rigidly interconnected to be simultaneously driven from a single gear 69. The driving connections for this gear comprise a chain 70 which in turn is driven from a conventional motor (not shown). The pockets in the pulley peripheries are provided to receive the wheel sets 45 and thereby insure against cable slippage. Slight flaring of the tracks 37 and 39 is provided at the pulley end of support members 41 and 43 to permit relatively free ingress of the wheel sets 45 into their respective tracks after they leave the pulleys.

Fig. 1 shows a view in side elevation of the left hand vine conveyor feeding vines to the combined vine and arm picker machine. At the truck end of this vine conveyor there is located an idler pulley 71, similar in construction to pulley 67, thus to complete an endless path for the graspers. In operation the empty vine graspers 35 proceed around pulley 71 in such a manner as to allow the handles 53 of these graspers to bear against bumper 57 and thereby move jaws 51 away from jaws 49. Thus with the jaws open, the butt ends of vines may be inserted between the respective jaw pairs with the weight of the vines serving to close them when the graspers move beyond the bumper. In this figure a series of unpicked vines 73 are shown progressing toward the picking units and a series of picked vines 75 are shown leaving the picking units to be discarded as a result of the vine graspers striking bumper 55 and opening the grasper jaws. The average unpicked hop vine to be carried by these graspers weighs in the neighborhood of 40 to 50 pounds and is comprised of a great number of vine branches or arms extending from the main stem in bush-like fashion. Machine picking reduces the weight of the vines to approximately 10 to 15 pounds because short arms as well as a great percentage of the foliage are separated from the vine during the hop removing process.

Accordingly, the mutually cooperating picking units with their respective picking arrays 7 are disposed farther apart at the vine feeding end of the machine (Fig. 3) than at the vine discharge end. Means are provided for adjusting the spacing between these units to insure thorough picking of the hops. Such means may comprise rollers 77 (Figs. 1 and 2) which are secured to the frames 1 and which move along a supporting beam 79. Obviously locking means must also be provided to maintain the frames 1 in position but as such structure may assume many of various simple mechanical forms, any showing thereof is herein omitted.

As the vines progress through the vine and arm picker machine, hop picking from the main vines is accomplished by the picking fingers 11 while traversing the vertical reaches 5 of the respective frames 1 (Fig. 2). The short arms or vine branches which are torn or broken off by this combining action fall onto a baffle 81 which directs them onto the conveyors 13 so that picking of the arms may be achieved by the picking arrays traversing the horizontal reaches 3 of the respective frames 1. Thus an L shaped column or picking surface is presented by each unit. Of peculiar importance is the fact that the direction of travel of the picking arrays along the horizontal reaches of mutually cooperating frames is respectively opposed thereby resulting in a tensile force being applied to the individual arms. While such tension is being applied to the arms, the conveyors 13 are moving these arms longitudinally of the picking units and hence optimum picking action is obtained. Finally, one of the picking units succeeds in drawing the arm beneath it where clamps 83 located along the conveyors 13 secure the arms to these conveyors so that further picking thereof may be accomplished by other units positioned successively along the conveyors in the direction of the conveyor travel.

A detailed representation of a portion of one of the conveyors 13 showing the clamps 83 appears in Figs. 8b and 8c. As may be seen from Fig. 8b, a wire mesh construction is employed for the conveyors 13. Preferably the hops which are separated from the vines and arms pass through these conveyors to be collected for later use, hence a mesh measuring about 2 by 3¾ inches is desirable. The clamps 83 are basically metal strips that define substantially right angles with the angles being offset from a supporting bar 85. A pair of endless cables or chains 87 is provided to impart motion to each of the conveyors 13. These chains are disposed along the outer edges of the wire mesh belts but do not connect to the belt. Instead, a plurality of the supporting bars 85 is laterally disposed along the chains 87 and each bar is affixed thereto. The wire mesh belt is placed over these supporting bars 85 to permit the clamps 83 to extend through the belt interstices. In this manner relative motion between the belt and the bars 85 allows the clamps 83 to grasp or snag short arms and to secure them to the conveyors 13 for movement along the picking units. From Fig. 2 it is apparent that the clamps 83 are open in the direction of the spacing between opposed frames so that the picking fingers 11 while moving from the vertical to the horizontal reaches of these respective frames will force the arms beneath the clamps 83. As the horizontal conveyors are rather extensive in length, longitudinal supports 86 are employed to prevent undue sagging of the wire mesh belts.

A modification of the clamps 83 is shown in Fig. 8e wherein uprising stubs 83' of preferably rectangular shape are disposed along the length of bars 85 to replace the clamps. Thus, the arms become sufficiently entangled in the mesh interstices and around these stubs to allow the conveyors to propel them beneath the picking units. Often times, however, the belt interstices serve to retain arms on the conveyors and hence members such as 83 and 83' may be eliminated.

At the vine discharge end of the machine there is provided an arm releasing mechanism for each of the conveyors 13 (Fig. 2d). One of these mechanisms may comprise an endless chain 89 adapted to ride around sprockets 91 (Fig. 2) which sprockets are located to move this chain transversely of the conveyor. Depending from the chain are a series of stubs 93 which may extend to a position adjacent, but free of, the conveyor clamps 83. As this mechanism is comparable in structure and function to the arm releasing mechanism for the short arm picker (later to be described), reference may be had to the drawing of Fig. 9a in conjunction with Fig. 2d wherein Fig. 9a is a view in perspective of an arm release in position adjacent an arm conveyor and Fig. 2d is a perspective view of like members of the combined machine. The chain 89 is moved in the direction of the arrows marked on sprocket 91 so that stubs 93 push the short arms out from under clamps 83 (Fig. 2d). If desired some sag may be provided in chain 89 to allow stubs 93 to extend almost to the belt surface thus effecting more reliable arm releasing action. The flexibility between the wire mesh belt and the transverse bars 85 permits the clamps 83 to strike the stubs 93 without damage to the equipment. Figs. 9a and 2d also show angle irons 94 which are positioned along the horizontal reaches of frames 1 to support the picking arrays 7 as they traverse these horizontal reaches. These angle irons are located in pairs such that the picking bars 9 are supported at each end by an angle iron. Further, when desired the ends of the bars 9 may be capped by metal cups (not shown) to prevent splintering of the bars as a result of continued use. In order that the spacing between the conveyors 13 and associated picking arrays 7 may be varied, suitable means are provided for raising or lowering the conveyor. Such means comprise the rack and pinion arrangement generally shown at 96 in Fig. 2d. Since the angle irons 94 and hence the picking arrays 7 are rigidly affixed against vertical movement, adjustment of the height of conveyor 13 serves to vary the degree of combing of the arms travelling along this conveyor.

As was earlier mentioned, all of the hops whether picked from the vines or the arms pass through the wire mesh conveyors 13 to be later separated from the foliage which has also filtered through the conveyors. Often times, however, a cluster of hops becomes entangled in the wire mesh and hence means must be provided for freeing these hops. Such means may comprise a pair of poles 95 (Fig. 1) which extend transversely of the conveyors 13 but within the belt enclosure. Each of these poles is provided with radial extensions 97, commonly called "fingers" which are adapted to brush against the upper inner surface of the belt. A drive pulley 99 is connected to rotate the poles 97 in a direction to oppose the adjacent belt motion thus to effectively allow the fingers to sever hop clusters from the belt surface.

After the hops have passed through the conveyor belts they fall upon sideboards 101 which collectively direct them onto a hop conveyor belt 103, which belt may be of canvas or other suitable material. Preferably the belt 103 is positioned on an incline rising toward the vine discharge end of the machine where it discharges the hops onto a wire mesh belt 105. The mesh of belt 105 is made slightly smaller than that of the conveyors 13 to partially separate the foliage from the hops, with the hops being sifted through this belt. The wire mesh belt runs transversely of the machine and hence also collects the picked short arms, which are released from the horizontal conveyors 13, and discards them beyond the machine area. This belt thus moves in the direction of the arrow such that the picked arms are discarded over an uprising end thereof. A pair of sprockets 106 are adapted to engage the mesh of belt 105 with the coupling therebetween spaced sufficiently above the belt surface to permit the picked arms to pass beneath the coupling. Hence the sprockets 106 retain belt 105 in position.

A separating belt 107 mounted beneath and at an angle to the belt 105 is provided with a canvas or other friction surface in order that most of the foliage which manages to fall through belt 105 will adhere to this surface to be discarded. A baffle 109 is offset sufficiently from the separating belt 107 to allow hops to pass thereunder but to retain most of the foliage on this belt. The cleaned hops which pass under baffle 109 are conveyed by a belt 111 directly to the dry kiln (not shown). These hops which pass directly to the dry kiln represent at least 25 per cent of the machine picked hops, hence such an arrangement is very desirable as recleaning is only necessary for the remaining hops. Thus a belt 113 is provided to carry these remaining hops to the recleaners (not shown). The foregoing belts located at the vine discharge end of the machine are adapted to be driven from sprockets 115 (Fig. 3) which extend on shafts 117 from the main driving mechanism for the picking arrays.

All of the belts and gears shown on the machine of Figs. 1–7 are capable of being driven from a single source of power but preferably at least three motors are employed to prevent undue coupling of isolated moving members. Each individual moving element has been supplied with a driving member and where convenient interconnections are provided, leaving the remaining connections to be supplied by those skilled in the art.

Often times it is desired to pick only short arms per se. For such picking there is provided, as is shown in Figs. 8–10, a modification of the machine hereinbefore described. This modification comprises basically the structure of the combined vine and arm picker machine except that the picking columns 121 are of conventional caterpillar shape rather than L shape. Horizontal arm conveyors 123, again of the construction as is shown in Fig. 8b are provided to cooperate with the picking arrays which form part of and move with the caterpillars 121. These picking arrays each include a plurality of picking bars 125 having picking fingers 127 disposed along the length thereof as is shown in Fig. 8a. By locating the caterpillars 121 at an angle (preferably 90 degrees) to the conveyors 123 and by disposing these caterpillars in opposite paired relation along the length of the conveyors, the optimum picking action, as was described in the description of the combined picker, is also obtained in the arm picker.

A short arm feeding belt 129 having cleats 131 distributed along the length thereof is adapted to deposit short arms in the space between the pair of caterpillars which are located to provide the initial arm picking. A baffle 133 disposed along the longitudinal center of this machine serves to direct the arms between the picking arrays and their respectively cooperating horizontal conveyors. Thus it is apparent that some picking may be accomplished along the vertical dimensions of the caterpillars thereby leaving the remainder or most of the short arm picking to the horizontal picking surfaces of these caterpillars. It should again be emphasized that short arms which are partially dragged beneath each of a pair of oppositely disposed caterpillars will be subject to opposed tearing or picking forces until one of the caterpillars succeeds in dragging the arm on a portion thereof between it and the associated horizontal conveyor where further picking takes place.

The horizontal conveyors extend sufficiently beyond the picking area to provide for supplementary feeding of the arm picker such as shovel or hand feeding. Also at this end of extension there is provided a rack and pinion mechanism 135 for adjusting the conveyor height and hence the spacing between the caterpillars 121 and the associated conveyors 123, thereby affording control over the degree of picking attained. At the opposite extremity of each of the conveyors there is provided the arm releasing mechanism of Figs. 8d and 9a which mechanism, was described in connection with the combined picker. As the conveyors 123 of this embodiment are also equipped with the clamps 83 which are disposed along the belt supporting bars 85 (Figs. 8b and 8c), the releasing mechanism including sprockets 91, cables 89 and studs 93 is required to free the picked arms from their clamped positions preparatory to discarding them onto a belt 137 which dumps the picked arms outside the machine area. Thus this belt is provided with cleats 139 which insure movement of the arms by the belt.

Also, in this modification the hops which have been separated from the arms fall through the horizontal conveyors 123 onto hop collecting belts 141 with sideboards 143 serving to direct the hops to these belts. The hop collecting belts 141 discharge these hops to a belt 145 which carries them to the cleaners (not shown since they are standard character and not any direct part of this invention) where the foliage and extraneous matter is removed from the desired hops. As hop clusters also become entangled in the mesh construction of the conveyors 123, finger means generally designated at 147 are provided to scrape these hops from the conveyors in the manner hereinbefore set forth.

Again, a single source of power such as the motor 149 is provided to drive all of the moving elements which are comprised in the arm picker machine. The interconnected driving means are shown in operative connection in Figs. 8 and 9. It will be understood that such a driving system with but slight modification may be employed on the combined vine and arm picker machine.

What is claimed is:

1. A hop-picking machine comprising a pair of spaced oppositely disposed frames each having at least a substantially horizontal and a substantially vertical reach extending upwardly from one end thereof, a plurality of picking means movably supported in endless chain-like array by said frames, means to move the picking means in chain-like array so that they traverse said horizontal and vertical reaches along planes substantially parallel thereto, a pair of mesh-belt conveyors each having a substantially horizontal reach below and transverse to the horizontal reach of said frames and so spaced therefrom as to subject bines on said conveyors to the action of said picking means, means associated with the conveyors to move them in a direction transverse to the moving picking means whereby bines carried by said mesh-belt conveyors are combed by said picking means in a direction transverse to the conveyor motion.

2. A hop-picking machine of a type capable of the simultaneous picking of hops vines and arms broken therefrom comprising a pair of oppositely disposed frames spaced to receive vines to be picked, each of said frames including a substantially horizontal and a substantially vertical reach extending upwardly from one end thereof, an endless-chain array of picking means supported by each frame, means to move the picking means relative to the frame and along the surfaces of said reaches, mesh-belt conveying means located adjacent to and beneath said picking means, means to move the conveyor transversely to the picking means so as to subject hop bines thereon to the action of said picking means, the said conveyor extending to said horizontal reaches in reaches transverse to the horizontal reaches of said picking means whereby hop-bearing bines introduced between said vertical reaches are picked by the picking means moving relative to the vertical reaches of the frames and hop-bearing arms torn from the bines being picked and gravitationally dropped into the mesh of the conveyors are picked by the same picking means moving relative to the horizontal reaches of the frames.

3. A hop-picking machine comprising at least two spaced oppositely disposed columns each having a substantially horizontal lower surface, picking means disposed in endless movable chain-like array, means to move the picking means to traverse the respective surfaces of said columns, at least two bine conveyors of mesh-belt construction respectively located beneath and adjacent to the lower surfaces of said columns to leave sufficient separation therebetween to accommodate hop bine arms, means to move the conveyors transversely relative to said picking means in horizontally opposed directions of motion to subject carried bine arms to said picking means simultaneously by the respective picking means traversing opposite surfaces of the columns and to subject arms torn from the bines and dropped on to the conveyors to picking by the same picking means traversing the lower surfaces of said columns.

4. A hop-picking machine as defined in claim 3 including retaining means for said hop bearing bine arms attached to said conveyor members.

5. A hop-picking machine comprising spaced oppositely disposed endless chain-like arrays of picking means, means associated with the picking means for moving them along substantially vertical and horizontal reaches, conveying means mounted adjacent to and beneath said horizontal reaches, means for moving the conveying means in a direction transverse to the movement to said horizontal reaches to carry portions of hop bines, the separation between the conveyors and the said horizontal reaches being such as to cause carried bines to be combed by the picking means along said horizontal reaches, said oppositely disposed arrays having like directions of movement along the vertical reaches thereof and opposed directions of movement along the horizontal reaches, whereby the said conveying means have a direction of motion substantially normal to all three directions of motion of said arrays so that hop bines positioned between said oppositely disposed arrays are subjected to combing by the picking means traversing said vertical array reaches and arms torn from the vines and dropped on to the conveying means are subjected to picking by the same picking means traversing the said horizontal reaches.

6. A hop picking machine comprising spaced oppositely disposed arrays, each of said arrays comprising a plurality of picking means connected in endless chain fashion and said arrays having reaches respectively substantially parallel and vertical, and horizontal and coplanar with that of the array disposed opposite thereto, means for moving said arrays in like direction along said parallel reaches to pick vines introduced into the space between the oppositely disposed arrays and in opposite directions along said coplanar reaches, conveying means positioned adjacent to and beneath said coplanar reaches, means associated with the conveying means for moving them in a direction transverse to the opposite motions of said picking means along said horizontal reaches to carry hop bines and arms torn from the bines being picked along the parallel reaches and subject them to said picking means, whereby portions of the bines torn off and carried by said conveying means are combed by said picking means in a direction transverse to the direction in which they are being conveyed.

7. A hop picking machine comprising an endless chain-like array of picking means, means associated with said picking means for mounting them for movement around a closed path including a horizontal reach, an endless mesh conveyor, means to move the conveyor transversely of the picking means, said conveyor having a horizontal reach extending beneath that of said array in a direction transverse thereto and spaced therefrom by distances as to subject bines on said conveyor to the action of said picking means, whereby bines resting on said conveyor and carried thereby in one direction are subjected to combing action by said picking means moving transversely to the direction of motion of the conveyed bines.

8. A hop picking machine comprising an endless belt conveyor, means for moving the conveyor along a horizontal reach adapted to carry hop bines therealong, a caterpillar mounted above said horizontal reach, hop picking means mounted in endless chain array, means for moving the picking means along said caterpillar said caterpillar being so spaced from said horizontal reach so as to permit the introduction of hop bines between said conveyor and said caterpillar and subject them to the action of said picking means, the motion of said array above said conveyor being transverse the direction of motion of said horizontal reach of the conveyor, whereby hop bines carried by said conveyor are combed by said picking means in a direction transverse to the motion of said conveyor.

9. A hop picking machine comprising a pair of endless belt conveyors each having a horizontal reach which is substantially coplanar with and parallel to the other, means for moving the conveyor along the reaches, a caterpillar mounted above each of said conveyors and spaced therefrom and a plurality of picking bars mounted in endless chain array around each of said caterpillars, means for moving the caterpillar in a direction transverse to the direction of motion of said conveyors said caterpillars being so spaced from said conveyors as to admit hop bines therebetween and subject them to the action of said picking bars, and means for moving said picking-means arrays around said caterpillars in opposite directions and away from each other along the sides of said caterpillars which are opposed to said conveyors, whereby bines introduced between said caterpillars are pulled by said picking means onto one or the other of said conveyors and are then combed by said picking means in a direction transverse to the motion of said conveyors as the bines are carried along thereby.

References Cited in the file of this patent

UNITED STATES PATENTS

| 288,743 | Swingle | Nov. 20, 1883 |
| 2,139,029 | Miller | Dec. 6, 1938 |
| 2,222,767 | Gray | Nov. 26, 1940 |
| 2,226,813 | Gray | Dec. 31, 1940 |
| 2,448,063 | Thys | Aug. 31, 1948 |
| 2,496,858 | Crowley | Feb. 7, 1950 |
| 2,608,973 | Coons | Sept. 2, 1952 |
| 2,677,378 | Dauenhauer | May 4, 1954 |